(12) United States Patent
Zhao et al.

(10) Patent No.: US 8,940,421 B2
(45) Date of Patent: Jan. 27, 2015

(54) BATTERY MODULE

(75) Inventors: Weiping Zhao, Superior Township, MI (US); Young Geun Park, Gyeongsan-si (KR)

(73) Assignees: Tyco Electronics Corporation, Berwyn, PA (US); Tyco Electronics AMP Korea Limited, Gyeongsan-Si (KR)

( * ) Notice: Subject to any disclaimer, the term of this patent is extended or adjusted under 35 U.S.C. 154(b) by 334 days.

(21) Appl. No.: 13/427,269

(22) Filed: Mar. 22, 2012

(65) Prior Publication Data

US 2013/0252032 A1 Sep. 26, 2013

(51) Int. Cl.
*H01M 2/12* (2006.01)
*H01M 2/20* (2006.01)
*H01M 2/10* (2006.01)

(52) U.S. Cl.
CPC ............ *H01M 2/206* (2013.01); *H01M 2/1077* (2013.01)
USPC .................................. 429/7; 429/432; 429/153

(58) Field of Classification Search
CPC . H01M 2/1077; H01M 2/206; H01M 2/1217; H01M 10/482
USPC ............................... 429/153, 432, 7
See application file for complete search history.

(56) References Cited

U.S. PATENT DOCUMENTS

| | | | |
|---|---|---|---|
| 3,735,232 A * | 5/1973 | Fister | 320/110 |
| 2007/0054561 A1 * | 3/2007 | Gutman et al. | 439/656 |
| 2010/0052692 A1 * | 3/2010 | Yano et al. | 324/427 |
| 2012/0115015 A1 * | 5/2012 | Park et al. | 429/159 |

* cited by examiner

*Primary Examiner* — Jonathan Jelsma

(57) ABSTRACT

A battery module includes battery cells arranged side-by-side in a stacked configuration, the battery cells having positive and negative cell terminals. Buss bars are electrically connected to corresponding cell terminals to electrically connect adjacent battery cells. A battery cover coupled to the battery cells. A module controller is held by the battery cover and is electrically connected to the buss bars to monitor a voltage of the corresponding buss bar.

16 Claims, 8 Drawing Sheets

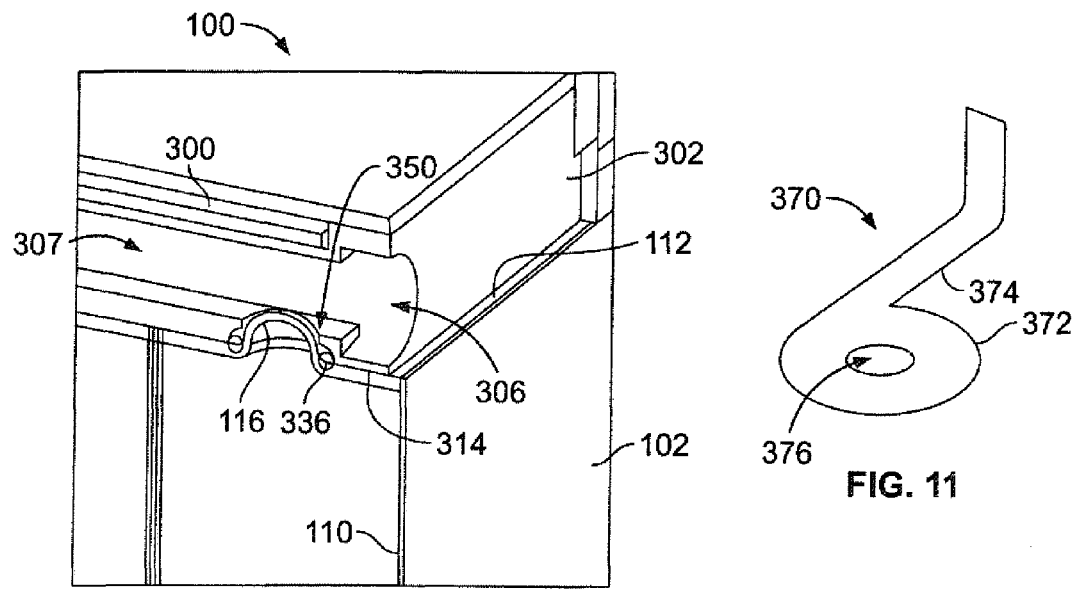
FIG. 10
FIG. 11
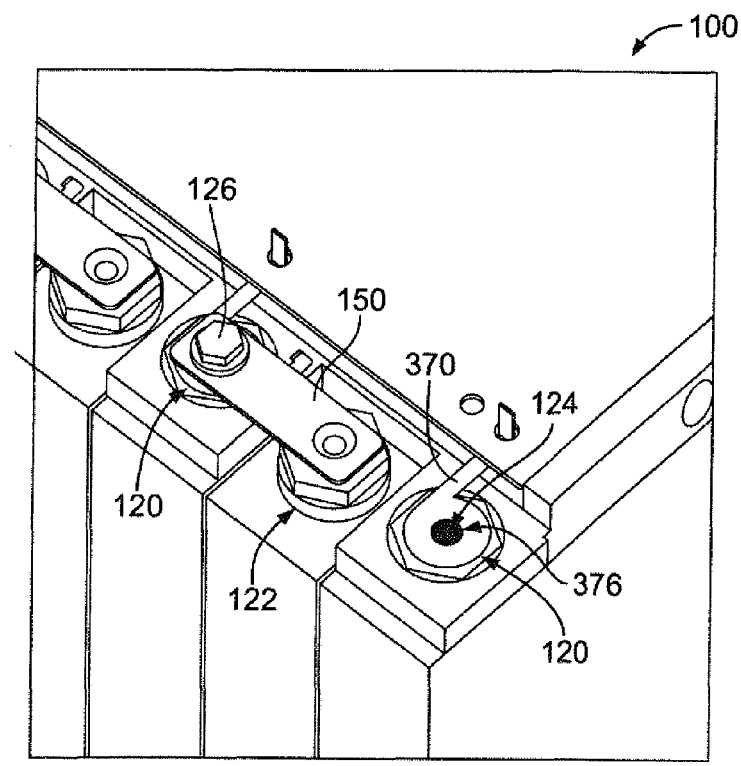
FIG. 12

BATTERY MODULE

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. Different types of battery modules are formed using different types of cells. For example, one type of battery modules are known as pouch type battery modules, another type of battery modules are known as prismatic battery modules, and a third type of battery modules are known as cylindrical battery modules. Prismatic battery modules use prismatic battery cells that are stacked together. The positive and negative cell terminals are connected using bus bars.

Known battery packs typically include a central controller that monitors the voltage and other characteristics of each of the cells of each of the battery modules. The central controller is electrically connected to each cell by wires or a wire harness. Sensing contacts are provided at the ends of the wires that are connected to corresponding cell terminals. The wire harnesses are bulky and occupy valuable space in the battery compartment of the vehicle. Having a dedicated space for the controller and the connections with the wire harnesses also occupies valuable space in the battery compartment or other area of the vehicle. Additionally, attaching each individual wire is time consuming. Furthermore, having the controller remote from the battery modules causes delay in the monitoring and/or less accurate readings.

A need remains for battery modules that may be assembled quickly. A need remains for a monitoring system for battery modules that does not use excessive space in the vehicle.

BRIEF DESCRIPTION OF THE INVENTION

In one embodiment, a battery module is provided including battery cells arranged side-by-side in a stacked configuration, the battery cells having positive and negative cell terminals. Buss bars are electrically connected to corresponding cell terminals to electrically connect adjacent battery cells. A battery cover coupled to the battery cells. A module controller is held by the battery cover and is electrically connected to the buss bars to monitor a voltage of the corresponding buss bar.

Optionally, the module controller may be electrically connected to the buss bars without wired connections therebetween. The module controller may include a circuit board and voltage signal contacts extending therefrom that are terminated to corresponding buss bars. The voltage signal contacts may be ring terminals that are electrically connected to the buss bars and/or the cell terminals to monitor a voltage thereof. The ring terminal may be bolted between buss bar and the cell terminal to electrically connect thereto. Optionally, the buss bars may include voltage signal pins extending therefrom with the voltage signal contacts being directly coupled to corresponding voltage signal pins. Each voltage signal contact may have forks with a gap therebetween with the voltage signal pins being received in corresponding gaps and engaged by corresponding forks to electrically connect the voltage signal pins and the voltage signal contacts.

Optionally, the battery cover may include a housing mounted directly to tops of the battery cells and a lid coupled to the housing. The housing may have a slot with the module controller received in the slot. The lid may cover the slot, module controller and buss bars. The housing and lid may surround the module controller. The housing and lid may surround the circuit board, the voltage signal contacts and the buss bars.

Optionally, the battery cells may have gas pressure valves. The battery cover may have having a gas vent manifold sealed to the gas pressure valves of the battery cells that vents gas exhausted through the gas pressure valves. The gas vent manifold may include a tunnel with each of the gas pressure valves being open to the tunnel. Vent seals may surround the gas pressure valves to seal the battery cover to the battery cells.

Optionally, the battery cover may include a housing having a top and a bottom. The module controller may be arranged along the top. The bottom may rest on the battery cells. The tunnel may be routed below the module controller. The tunnel may be open at opposite ends of the battery cover with caps being coupled to the ends.

In another embodiment, a battery module is provided having battery cells arranged side-by-side in a stacked configuration. The battery cells have positive and negative cell terminals. The battery cells have gas pressure valves. Buss bars are electrically connected to corresponding cell terminals to electrically connect adjacent battery cells. A battery cover is coupled to the battery cells. The battery cover holds a module controller that is electrically connected to the buss bars to monitor a voltage of the corresponding buss bar. The battery cover has a gas vent manifold sealed to the gas pressure valves of the battery cells. The gas vent manifold is configured to vent gas exhausted through the gas pressure valves.

BRIEF DESCRIPTION OF THE DRAWINGS

FIG. 10 is an enlarged view of portion of the section shown in FIG. 9.

FIG. 11 illustrates a voltage signal contact for the battery module.

FIG. 12 illustrates the battery module with the voltage signal contacts shown in FIG. 11.

DETAILED DESCRIPTION OF THE INVENTION

Figure 1:
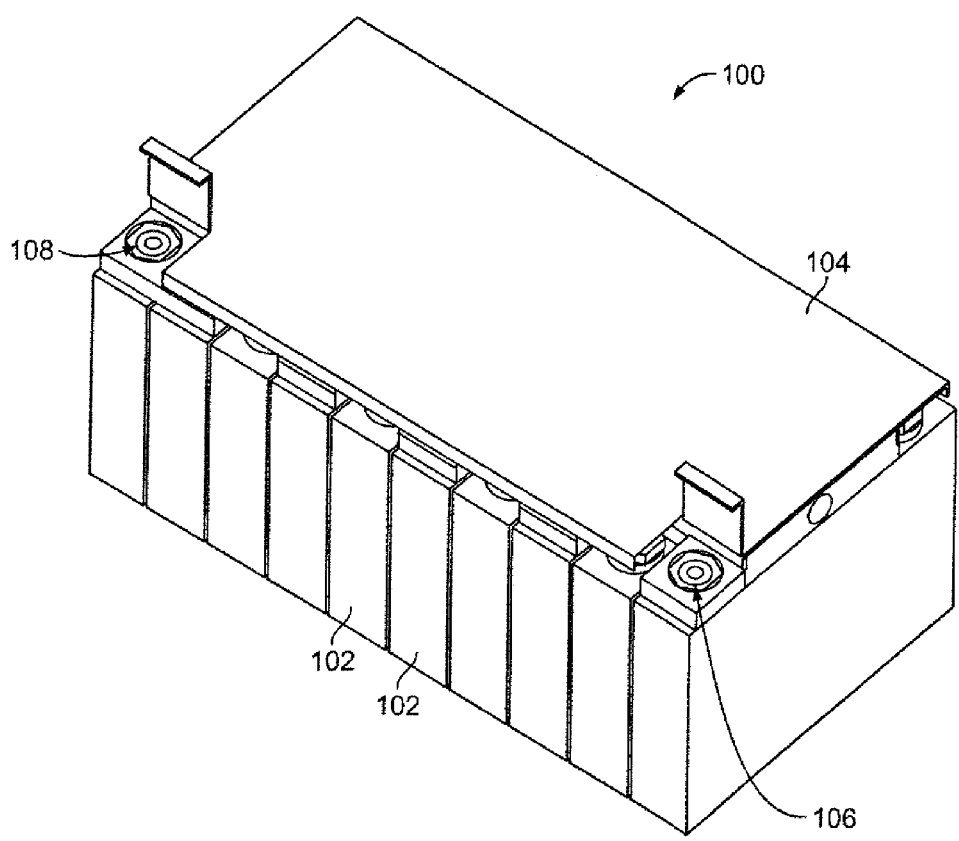
FIG. 1 is a top perspective view of a battery module formed in accordance with an exemplary embodiment.

FIG. 1 is a top perspective view of a battery module 100 formed in accordance with an exemplary embodiment. The battery module 100 may be used as part of a battery system in a vehicle, such as an electric vehicle or a hybrid electrical vehicle. The battery module 100 may be used in other applications in alternative embodiments.

The battery module 100 includes a plurality of prismatic battery cells 102. The prismatic battery cells 102 are arranged in a stacked configuration, side-by-side, to form the battery module 100. Optional, the battery module 100 may include a case or other housing that holds the prismatic cells 102. A battery cover 104 is provided over the tops of the prismatic battery cells 102. The battery cover 102 may cover each of the prismatic battery cells 102.

The battery module 100 includes a positive battery terminal 106 and a negative battery terminal 108. The battery terminals 106, 108 are configured to be coupled to an external power cable or alternatively may be bussed to battery terminals of another battery module 100. In an exemplary embodiment, the battery terminals 106, 108 are of different types. The battery terminals 106, 108 are configured to be connected using different types of connections. For example, the positive battery terminal 106 may be coupled using a threaded connection while the negative battery terminal 108 may be coupled using a quick connect type of connection.

Figure 2:
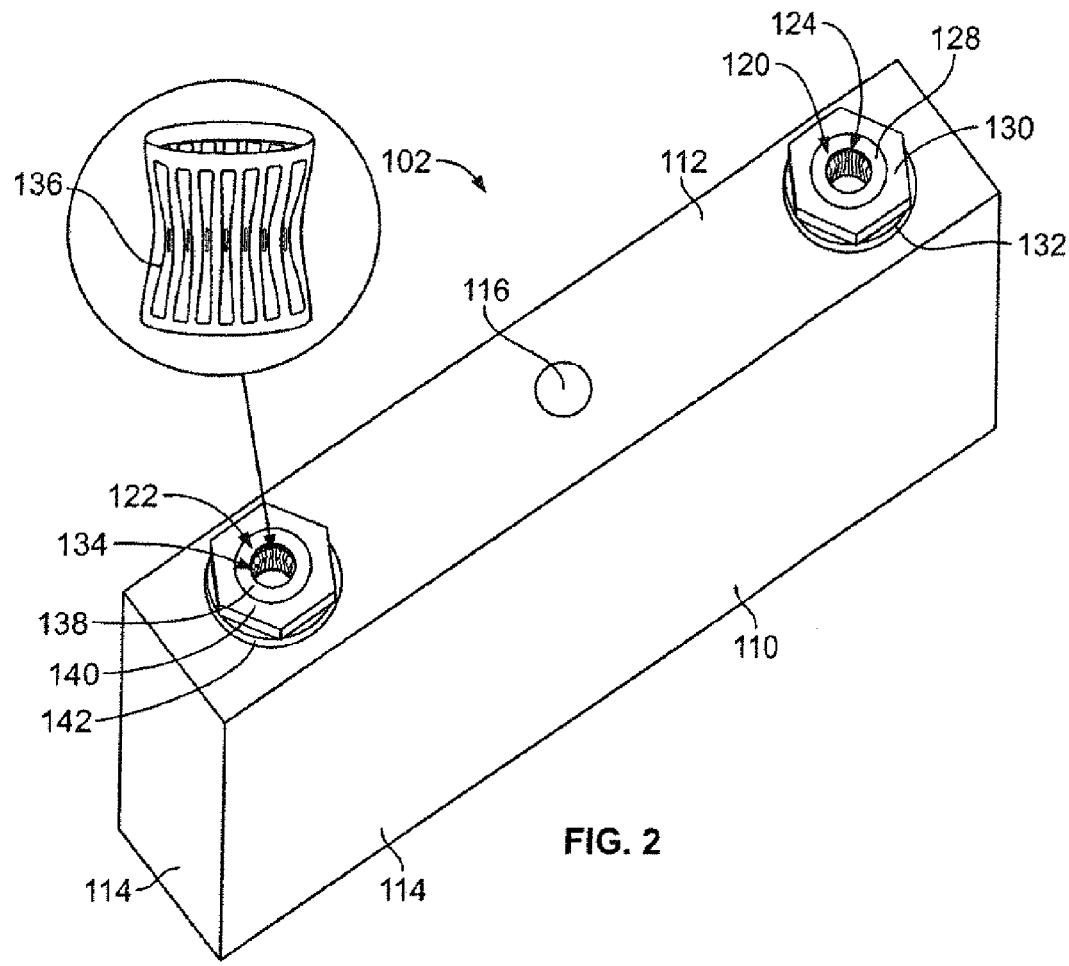
FIG. 2 is a top perspective view of a prismatic battery cells formed in accordance with exemplary embodiment for use with the battery module shown in FIG. 1.

FIG. 2 is a top perspective view of one of the prismatic battery cells 102 formed in accordance with exemplary embodiment. The prismatic battery cell 102 includes a cell housing 110 having a top 112 and side walls 114. In the illustrated embodiment, the cell housing 110 is boxed shaped having four side walls 114. The battery cell 102 has a gas pressure valve 116 on the top 112.

The battery cell 102 includes a positive cell terminal 120 and a negative cell terminal 122. The positive cell terminal 120 defines a threaded cavity that is configured for a threaded connection. The negative cell terminal 122 defines a smooth bore that is configured for a quick connect connection.

Figure 4:
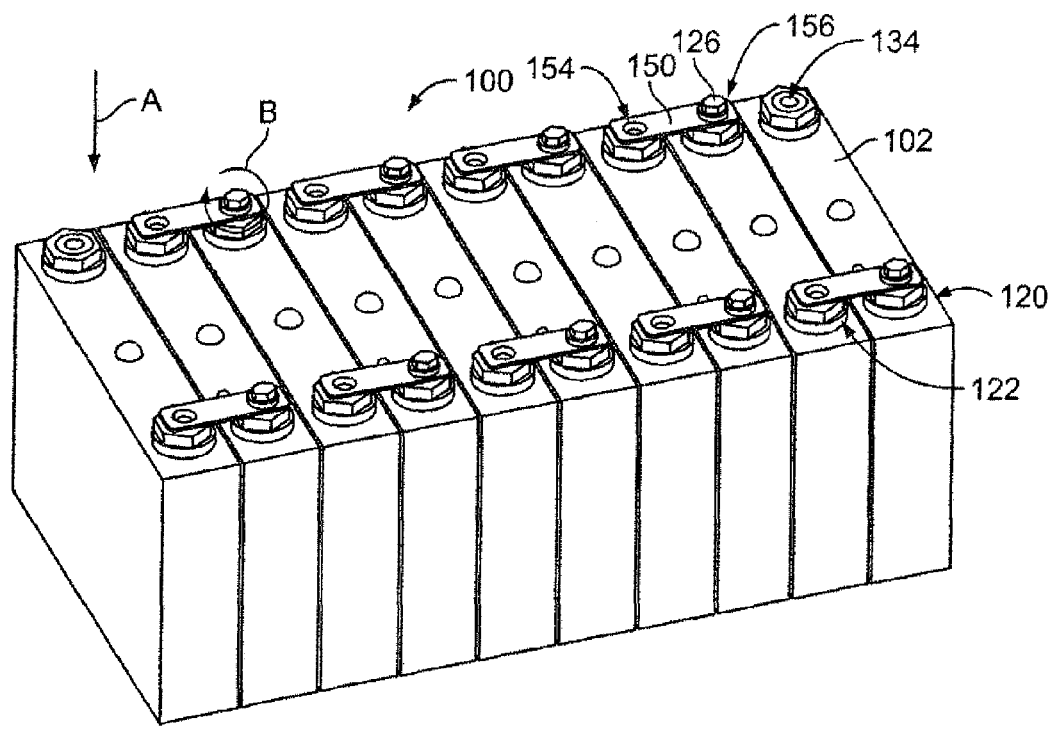
FIG. 4 is a top perspective view of the battery module illustrating the buss bars shown in FIG. 3 connected between the battery cells shown in FIG. 2.

The positive cell terminal 120 includes a threaded bore 124 that is configured to threadably receive a threaded screw 126 (shown in FIG. 4). The positive cell terminal 120 has an upper shoulder 128 exposed at a top of the positive cell terminal 120. A hex nut 130 is coupled to the positive cell terminal 120 to hold the positive cell terminal 120 with respect to the top 112 of the cell housing 110. A spacer 132 is positioned between the hex nut 130 and the top 112 of the cell housing 110. Other connection means or components may be used in alternative embodiments to secure the positive cell terminal 120 to the cell housing 110.

The negative cell terminal 122 includes a smooth bore 134 therein. The bore 134 receives a contact spring 136 (shown poised for loading into the bore 134). The negative cell terminal 122 has an upper shoulder 138 exposed at a top of the negative cell terminal 122. A hex nut 140 is coupled to the negative cell terminal 122 to hold the negative cell terminal 122 with respect to the top 112 of the cell housing 110. A spacer 142 is positioned between the hex nut 140 and the top 112 of the cell housing 110. Other connection means or components may be used in alternative embodiments to secure the negative cell terminal 122 to the cell housing 110.

Figure 3:
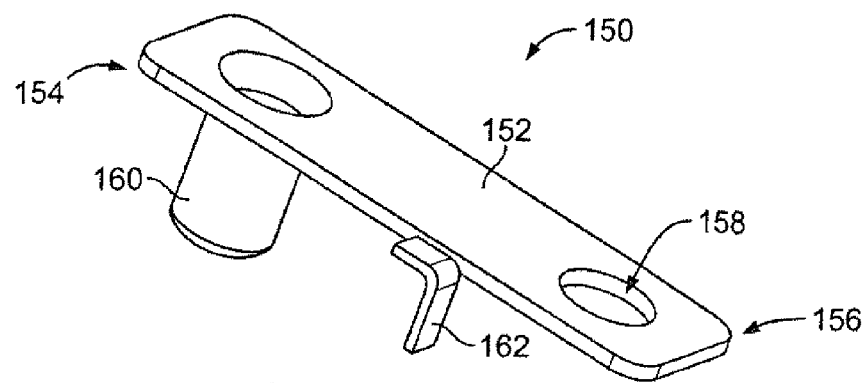
FIG. 3 is a top perspective view of a buss bar formed in accordance with an exemplary embodiment.

FIG. 3 is a top perspective view of a buss bar 150 formed in accordance with an exemplary embodiment. The buss bar 150 is used to electrically connect battery terminals of adjacent prismatic battery cells 102 (shown in FIG. 2). The buss bar 150 includes a plate 152 extending between a quick connection end 154 and a threaded connection end 156. The plate 152 includes an opening 158 at the threaded connection end 156. The opening 158 is configured to receive a threaded fastener, such as the threaded screw 126 (shown in FIG. 4), therethrough. Optionally, the opening 158 maybe elongated along a longitudinal axis of the plate 152 to adjust alignment between the cell terminals 120, 122 (shown in FIG. 2). In the illustrated embodiment, the plate 152 is generally rectangular in shape and is elongated along the longitudinal axis of the plate 152. The plate 152 may have other shapes and alternative embodiments.

The plate 152 includes a post 160 extending therefrom at the quick connection end 154. Optionally, the post 160 may be cylindrical in shape. In the illustrated embodiment, the post 160 extends downward from the plate 152. The post 160 extends out of a plane defined by the plate 152. Optionally, the post 160 may be hollow. In an exemplary embodiment, the post 160 is extruded from the plate 152. The post 160 may be formed by other processes and alternative embodiments. Optionally, the post 160 may be integrally formed with the plate 152. Alternatively, the post 160 may be a separate component from the plate 152 and coupled thereto, such as by soldering, welding, fastening or otherwise securing the post 160 to the plate 152. The post 160 may be hollow or may be solid.

In an exemplary embodiment, the buss bar 150 includes a voltage sensing pin 162 extending therefrom. The location of the voltage sensing pin 162 may vary depending on the particular application. Some embodiments may not include a voltage sensing pin 162. In the illustrated embodiment, the voltage sensing pin 162 is approximately centered between the opening 158 and the post 160. The voltage sensing pin 162 is bent out of the plane defined by the plate 152. In an exemplary embodiment, the voltage sensing pin 162 is integrally formed with the plate 152. In alternative embodiments, the voltage sensing pin 162 may be a separate component coupled to the plate 152, such as by being soldered, welded, fastened or otherwise secured to the plate 152. Optionally, the voltage sensing pin 162 may be stamped and formed with the plate 152. The voltage sensing pin 162 may be electrically connected to a module controller that monitors the voltage of the cells by measuring the voltage across the buss bar 150.

FIG. 4 is a top perspective view of the battery module 100 with the battery cover 104 (shown in FIG. 1) removed to illustrate the battery cells 102 and the buss bars 150 connected between the battery cells 102. The battery cells 102 are arranged side-by-side adjacent one another. The cell terminals 120, 122 are generally aligned with corresponding cell terminals 120, 122 of adjacent battery cells 102 near outer edges of the battery cells 102. In an exemplary embodiment, the battery cells 102 are arranged such that the positive cell terminal 120 of each battery cell 102 is located between negative cell terminals 122 of the two adjacent battery cells 102. Similarly, each negative cell terminal 122 is located between positive cell terminals 120 of the two adjacent battery cells 102. The cell terminals 120, 122 thus have an alternating positive-negative-positive-negative configuration.

The buss bars 150 are used to connect adjacent battery cells 102. Each buss bar 150 is connected to a positive cell terminal 120 of one battery cell 102 and a negative cell terminal 122 of an adjacent battery cell 102. The quick connection end 154 of each buss bar 150 is coupled to one of the negative cell terminals 122 while the threaded connection end 156 of each buss bar 150 is coupled to the corresponding positive cell terminal 120 using a corresponding threaded screw 126. The quick connect connection between the buss bar 150 and the negative cell terminal 122 is made by plugging the post 160 (shown in FIG. 3) of the buss bar 150 onto the negative cell terminal 122. The quick connect connection is made by an action in an linear direction, such as shown by arrow A, while the threaded connection is made by an action of rotating the threaded screw 126 in a rotation direction, such as shown by arrow B. No other action is required to make the electrical connection between the buss bar 150 and the negative cell terminal 122 other than plugging the post 160 into the bore 134 of the negative cell terminal 122. Having the buss bar 150 connected to the two battery cells 102 by only making one threaded connection reduces the assembly time of the battery module 100. For example, half the number of threaded connections need to be made when utilizing buss bars 150 with quick connect connections. Eliminating threaded connections to some of the cell terminals (e.g. the negative cell terminals 122) eliminates potential failure modes due to over tightening, under tightening cross-threading and the like. In alternative embodiments, the quick connect end may be coupled to the positive cell terminal 120 while the threaded connection end is coupled to the negative cell terminal 122.

Figure 5:
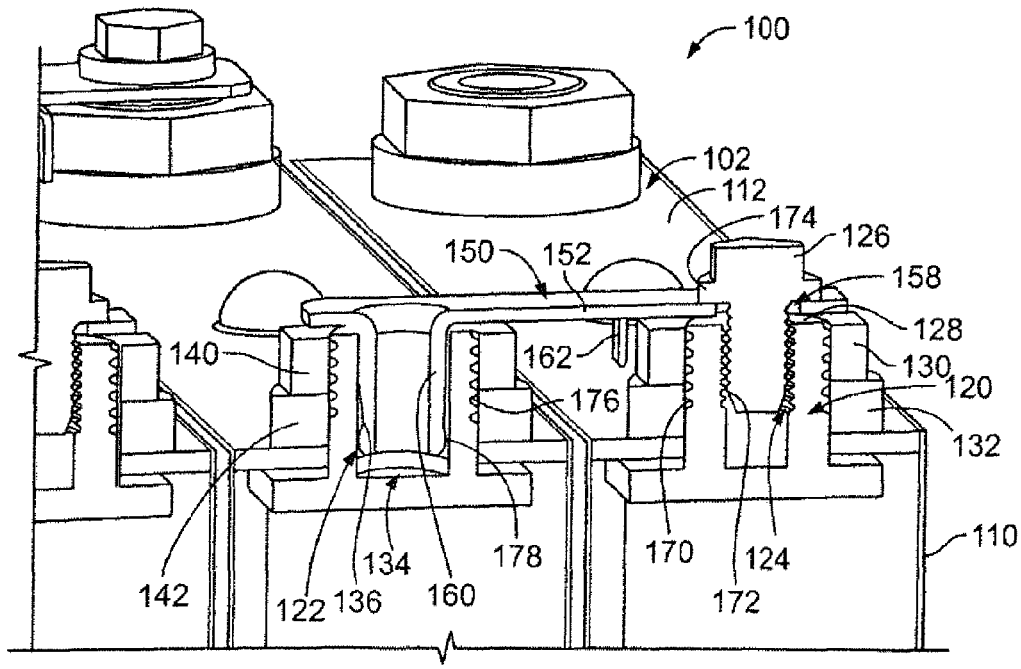
FIG. 5 is a partial cross sectional view of a portion of the battery module.

FIG. 5 is a partial cross sectional view of a portion of the battery module 100. The positive cell terminal 120 is shown connected to the cell housing 110 using the hex nut 130 with the spacer 132 between the hex nut 130 and the top 112 of the cell housing 110. The positive cell terminal 120 includes external threads 170 that are coupled to the hex nut 130 to secure the positive cell terminal 120 to the cell housing 110. Other fixing structures may be used in alternative embodiments to secure the positive cell terminal 120 to the cell housing 110.

The threaded bore 124 of the positive cell terminal 120 is also illustrated in FIG. 5. The threaded screw 126 is coupled to internal threads 172 of the threaded bore 124. In an exemplary embodiment, the positive cell terminal 120 is manufactured from aluminum. The threaded screw 126 is manufactured from steel. Other materials may be used for the components in other embodiments. A mechanical and electrical connection is made between the terminal screw 126 and the cell terminal 120.

The opening 158 of the buss bar is aligned with the threaded bore 124 such that the threaded screw 126 may be passed through the opening 158 into the threaded bore 124. As the threaded screw 126 is tighten, the plate 152 is captured between a head 174 of the threaded screw 126 and the upper shoulder 128. An electrical connection is made between the buss bar 150 and the positive cell terminal 120 by the intimate contact between the buss bar 150 and the upper shoulder 128 and/or by an electrical path defined between the positive cell terminal 120 and the threaded screw 126.

The negative cell terminal 122 is illustrated in FIG. 5 connected to the cell housing 110 by the hex nut 140. The negative cell terminal 122 includes external threads 176 that are engaged by the hex nut 140 to couple the negative cell terminal 122 to the cell housing 110. The spacer 142 is captured between the hex nut 140 and the top 112 of the cell housing 110. Other fixing structures may be used in alternative embodiments to secure the negative cell terminal 122 to the cell housing 110.

The smooth bore 134 of the negative cell terminal 122 is illustrated in FIG. 5. The contact spring 136 is received in the bore 134 and engages the wall of the negative cell terminal 122 defining the bore 134. The contact spring 136 is electrically connected to the negative cell terminal 122 by the direct engagement between the contact spring 136 and the negative cell terminal 122 and the bore 134. In an exemplary embodiment, the negative cell terminal 122 is manufactured from copper or a copper alloy. The contact spring 136 is manufactured from copper or a copper alloy. The buss bar 150 is plugged into the contact spring 136 and negative cell terminal 122 is manufactured from copper or a copper alloy. Other materials may be used for the components in other embodiments.

The post 160 is sized and shaped to fit into the bore 134. When the post 160 is loaded into the bore 134, an outer surface 178 of the post 160 engages the contact spring 136. The contact spring 136 is spring biased against the outer surface 178 of the post 160 to ensure engagement between the post 160 and the contact spring 136. An electrical path is created between the post 160 and the negative cell terminal 122 by the contact spring 136. No other mechanical manipulation of the buss bar 150 or the post 160 is needed to create the electrical connection between the buss bar 150 and the negative cell terminal 122 other than plugging the post 160 directly into the bore 134. A quick connection is defined between the negative cell terminal 122 and the buss bar 150.

When the buss bars 150 are coupled to the cell terminals 120, 122, the voltage sensing pins 162 face inward into the interior space between the rows of cell terminals 120, 122. The voltage sensing pins 162 are configured to be electrically connected to a module controller (not shown) positioned along the middle of the battery cells 102. The voltage sensing pins 162 are configured to be directly connected to such module controller rather than being connected to a remote module controller by individual wires configured as a wire harness extending from the battery module 100 to such remote location.

Figure 6:
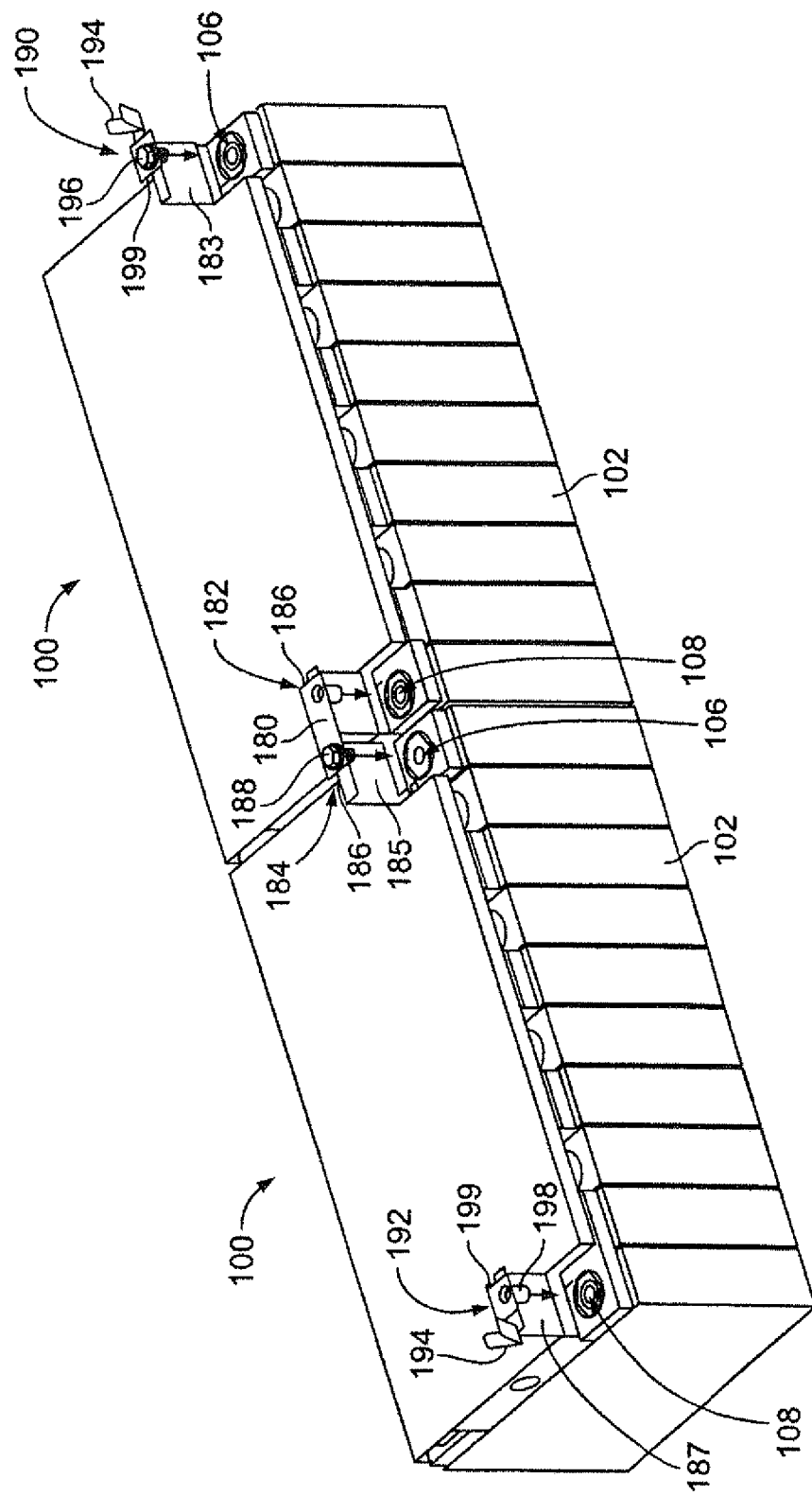
FIG. 6 illustrates two battery modules arranged adjacent one another in line with one another.

FIG. 6 illustrates two battery modules 100 arranged adjacent one another in line with one another. A module to module buss bar 180 is used to electrically connect one battery module 100 with the other battery module 100. The module-to-module buss bar 180 may be similar to the buss bars 150 (shown in FIG. 3). The module-to-module buss bar 180 includes a quick connection end 182 and a threaded connection end 184. The quick connection end 182 is configured to be coupled to the negative battery terminal 108 of one of the battery modules 100 while the threaded connection end 184 is configured to be coupled to the positive battery terminal 106 of the other battery module 100. The positive and negative battery terminals 106, 108 are defined by the outermost positive and negative cell terminals 120, 122 (shown in FIG. 4) of the outermost battery cells 102 of the battery module 100.

In an exemplary embodiment, voltage sensing pins 186 extend from each of the ends 182, 184 of the module to module buss bar 180. The voltage sensing pins 186 extending from the longitudinal ends of the buss bar 180 as opposed to a centrally located side of the buss bar, as is the case with the buss bars 150. Other positions are possible in alternative embodiments. A threaded screw 188 is used to secure the buss bar 180 to the corresponding battery module 100. The threaded screw 188 may be identical to the threaded screws 126 (shown in FIG. 4) used to secure the buss bars 150 between the battery cells 102.

A positive battery terminal contact 190 is configured to be coupled to a positive battery terminal 106 of one of the battery modules 100 while a negative battery terminal contact 192 is configured to be coupled to the negative battery terminal 108 of the corresponding battery module 108. The terminal contacts 190, 192 have crimp ends 194 that are configured to be crimped to ends of wires or cables that supply power to the battery modules 100. The positive battery terminal contact 190 defines a threaded connection while the negative battery terminal contact 192 defines a quick connect connection. For example, the positive battery terminal contact 190 is coupled to the positive battery terminal 106 using a threaded screw 196, while the negative battery terminal contact 192 includes a post 198 similar to the post 160 (shown in FIG. 3) of the buss bars 150. The terminal contacts 190, 192 includes voltage sensing pins 199 extending therefrom.

In an exemplary embodiment, plastic covers 183, 185, 187 are closed after the buss bar 180 and battery terminal contacts 190, 192 are fully engaged with the corresponding battery cell terminals 106, 108.

Figure 7:
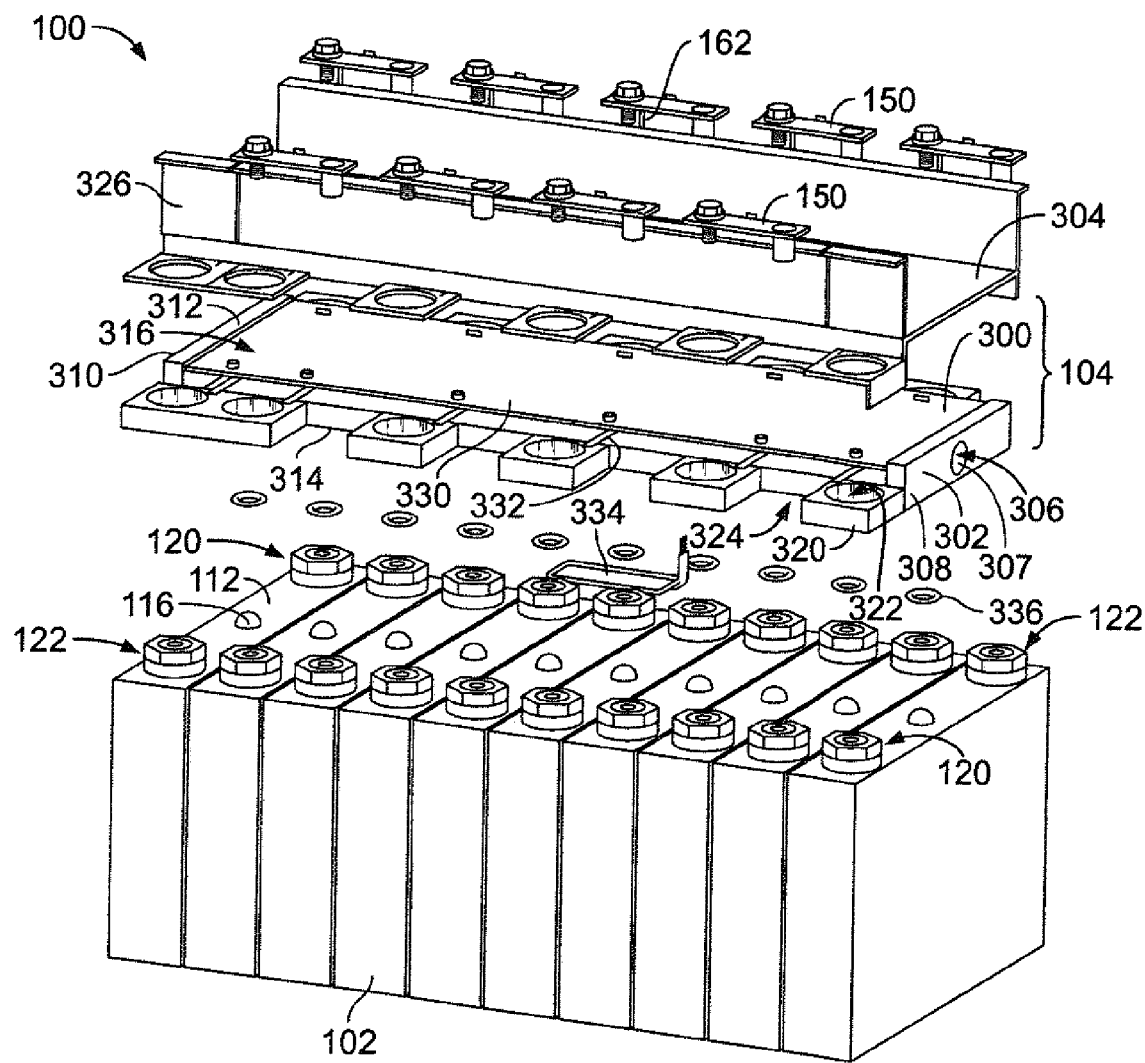
FIG. 7 is an exploded view of the battery module showing the battery cells arranged in a stacked configuration.

FIG. 7 is an exploded view of the battery module 100 showing the battery cells 102 arranged in a stacked configuration. The battery module 100 includes a module controller 300 that is used to monitor characteristics of the battery cells 102. For example, the module controller 300 is used to monitor voltages of the battery cells 102 via the buss bars 150. The module controller 300 is held by the battery cover 104 and becomes an integral part of the battery module 100 as opposed to being located remote from the battery module 100 and connected to the battery module 100 by individual wires of a wire harness. Having the module controller 300 part of the battery module 100 provides a compact design for the battery system. Having the module controller 300 integrated into the battery module 100 allows for direct connection to the buss bars 150 for accurate voltage measurements. Having the module controller 300 integrated into the battery module 100 eliminates the need for excessive wires and wire harnesses and individual wire terminations. Having the module controller 300 integrated into the battery module 100 eliminates the need for a designated area in the vehicle for a remote or central controller and eliminates the need for space to route wires and wire harnesses.

The buss bars 150 are illustrated poised for mounting to the corresponding battery cells 102. The voltage sensing pins 162 of the buss bars 150 are electrically connected to the module controller 300 to provide an interface between the battery cells 102 and the module controller 300.

The battery cover 104 includes a housing 302 and a lid 304 coupled to the housing 302. The housing 302 is configured to be mounted to the tops 112 of the battery cells 102. The housing 302 is mounted over the gas pressure valves 116. The housing 302 includes a gas vent manifold 306 that is used to vent gas exhausted through the gas pressure valves 116. The gas vent manifold 306 is configured to be sealed against the tops 112 of the battery cells 102 around the gas pressure valves 116. The gas vent manifold 306 includes a tunnel 307 open at one or both ends 308, 310 of the battery cover 104 to exhaust gas from the gas vent manifold 306.

The housing 302 includes a top 312 and a bottom 314. The bottom 314 is configured to be mounted to the tops 112 of the battery cells 102. The top 312 includes a slot 316 that receives the module controller 300. The lid 304 is mounted to the top 312 above the slot 316 in the module controller 300. The housing 302 and the lid 304 together surround the module controller 300.

The housing 302 includes legs 320 extending outward from both sides of the housing 302. The legs 320 include openings 322 therethrough. Spaces 324 are provided between the legs 320. When the housing 302 is mounted to the battery cells 102, the cell terminals 120, 122 are received in corresponding openings 322 and spaces 324. The legs 320 surround corresponding cell terminals 120 and/or 122. When assembled, the lid 304 fits over the housing 302 and the legs 320. The lid 304 includes tabs 326 that may be closed and/or locked over the legs 320, cell terminals 120, 122 and buss bars 150.

The module controller 300 includes a circuit board 330 having one or more electrical components (not shown) mounted thereto for controlling and/or monitoring electrical characteristics of the battery cells 102. Optionally the electrical components may be mounted on the bottom side of the circuit board 330 in spaces provided in the housing 302, such as alongside the tunnel 307, so as to provide a low profile for the battery cover 104. For example, having the electrical components mounted between the circuit board 330 and the battery cells 102 in the space between the tunnel 307 and the legs 320 uses space that would otherwise be wasted as the housing 302 needs to have a certain height to accommodate the gas vent manifold 306.

The module controller 300 includes a plurality of voltage signal contacts 332 terminated to the circuit board 330. The voltage signal contacts 332 may be through hole mounted in through holes extending through the circuit board 330. Alternatively, the voltage signal contacts 332 may be surface mounted to the circuit board 330. The voltage signal contacts 332 may be soldered to the circuit board 330. The voltage signal contacts 332 may be terminated by other means to the circuit board 330. The voltage signal contacts 332 extend from the circuit board 330 and are configured to be mechanically and electrically coupled to corresponding voltage signal pins 162 of the buss bars 150. In an exemplary embodiment, the circuit board 330 is electrically connected to each of the buss bars 150 via the voltage signal pins 162 and voltage signal contacts 332. As such, the voltage of each buss bar 150 may be monitored by the module controller 300.

In an exemplary embodiment, a thermistor 334 is configured to be coupled to the circuit board 330. The thermistor 334 may be mounted to one or more of the battery cells 102 to measure a temperature of such battery cells 102. Such temperature readings are monitored by the module controller 300 to control operation of the battery module 100.

Gas vent seals 336 may be coupled to the gas pressure valves 116 of the battery cells 102. The gas vent seals 336 may seal against the housing 302.

Figure 8:
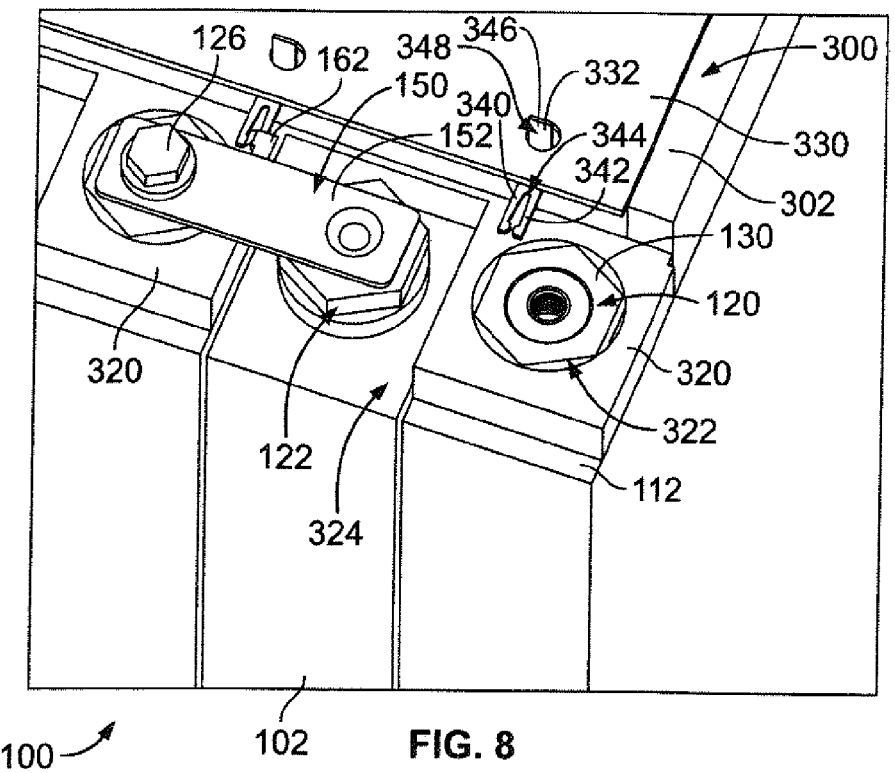
FIG. 8 is a top perspective view of a portion of the battery module.

FIG. 8 is a top perspective view of a portion of the battery module 100. The housing 302 is mounted to the tops 112 of the battery cells 102. The positive cell terminals 120 are loaded into the openings 322. In an exemplary embodiment, the hex nuts 130 may be held in the openings 322 by an interference fit to secure the housing 302 to the battery cells 102. The negative cell terminals 122 are received in the spaces 324. The buss bar 150 is illustrated coupled to the corresponding cell terminals 120, 122. The plate 152 of each buss bar 150 extends over the corresponding leg 320, which may be used to secure the housing 302 to the battery cells 102. The threaded screw 126 secures the buss bar 150 to the cell terminal 120.

When the module controller 300 is positioned in the housing 302, the voltage signal contacts 332 are aligned with, and electrically coupled to, corresponding voltage signal pins 162. The voltage signal contacts 332 have a split fork design with forks 340, 342 defining a gap 344 therebetween. The voltage signal pin 162 is received in the gap 344 between the forks 340, 342. The forks 340, 342 may be spring biased against the voltage signal pin 162 to ensure electrical connection between the voltage signal contact 332 and the corresponding voltage signal pin 162. In the illustrated embodiment, the voltage signal contacts 332 are L shaped having a tail 346 extending perpendicular to the forks 340, 342. The tail 346 is received in a corresponding through hole 348 of the circuit board 330.

Figure 9:
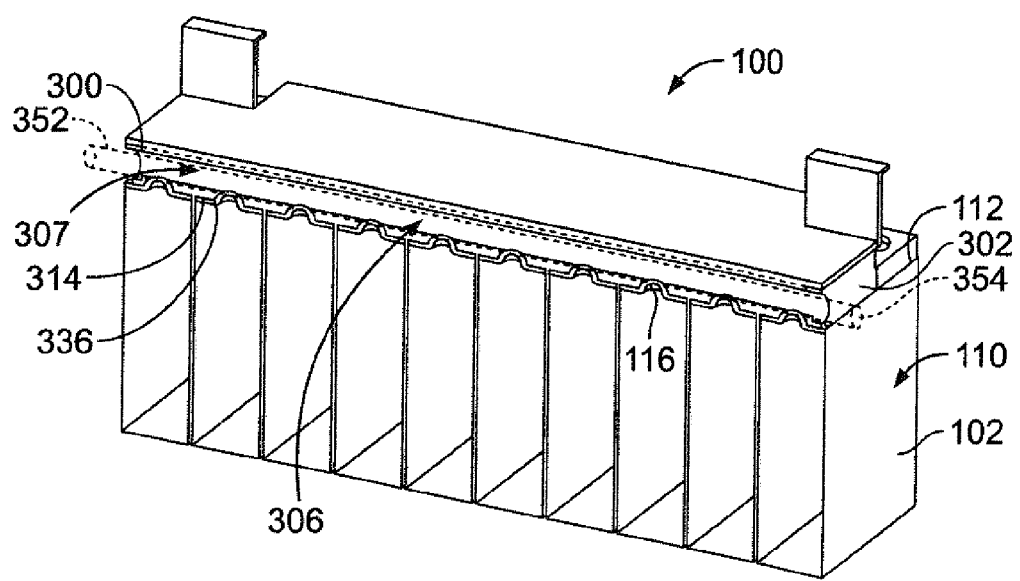
FIG. 9 is a sectional view of the battery module.

FIG. 9 is a sectional view of the battery module 100 taken through the gas pressure valves 116 and the gas vent manifold 306. FIG. 10 is an enlarged view of portion of the section shown in FIG. 9. The gas vent manifold 306 is in fluid communication with each of the gas pressure valves 116. Openings 350 extend through the bottom 314 of the housing 302 to the tunnel 307. The openings 350 receive corresponding gas pressure valves 116. The gas vent seals 336 are also at least partially received in the openings 350 to provide a seal between the housing 302 and the battery cells 102.

The gas pressure valve 116 is defined by a bubble on the top 112 of the cell housing 110. The gas pressure valve 116 is thinner than other areas of the cell housing 110. The gas pressure valve 116 defines an area of the cell housing 110 that will rupture upon a gas build up within the battery cell 102. The rupturing of the gas pressure valve 116 releases the gas into the gas vent manifold 306 where the gas may be exhausted from the battery module 100 and/or the vehicle. Optional, a sensor may be provided in the gas vent manifold 306 to monitor for the presence of gas. Such sensor may be electrically connected to, and monitored by, the module controller 300.

End caps 352, 354 are illustrated in FIG. 9. The end caps 352, 354 may seal one or both ends of the tunnel 307. The end caps 352, 354 may constitute pipes that extend from the battery module 100. For example, the pipes may be rubber tubes. The pipes may extend to a gas vent manifold of an adjacent battery module such that the gas may flow through multiple battery modules 100. The pipe may be routed away from the battery module 100, such as to an exterior of the vehicle or to a safe location where the gas may be disbursed.

FIG. 11 illustrates an alternative voltage signal contact 370 defined by a ring 372 and a tail 374 extending from the ring 372. The tail 374 may be terminated to the circuit board 330 (shown in FIG. 7). The ring 372 has an opening 376 therethrough. The tail 374 may be deflectable to allow for positioning of the ring 372 relative to the portion of the tail 374 that is coupled to the circuit board 330.

FIG. 12 illustrates the battery module 100 using the voltage signal contacts 370 (as opposed to the voltage signal contacts 332 shown in FIG. 7). The voltage signal contacts 370 are configured to be directly connected to the buss bar 150 and/or the positive cell terminal 120. For example, the voltage signal contact 370 may be positioned between the upper shoulder 128 (shown in FIG. 2) and the bottom of the buss bar 150. The threaded screw 126 passes through the opening 376 into the threaded bore 124 of the positive cell terminal 120. In an alternative embodiment, the voltage signal contacts 370 may be coupled to the negative cell terminals 122 rather than the positive cell terminals 120. In other alternative embodiments, the voltage signal contacts 370 may be terminated to voltage signal pins extending from the buss bars 150.

Figure 13:
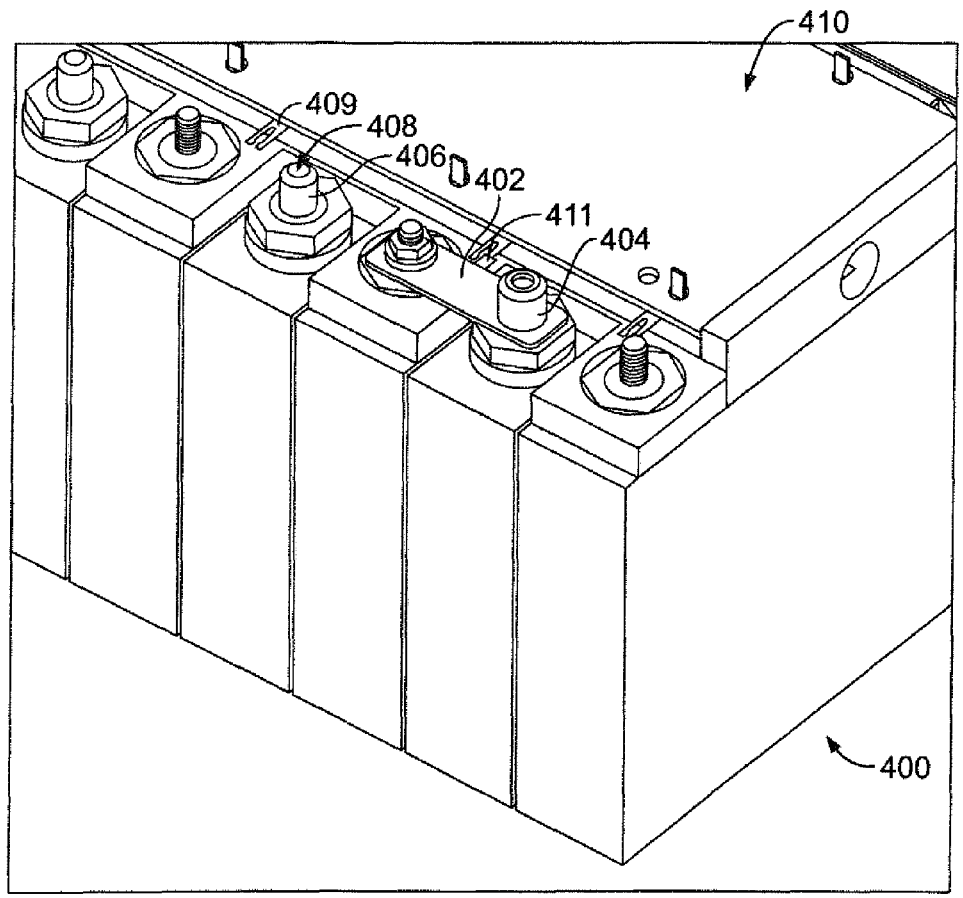
FIG. 13 illustrates a battery module formed in accordance with an exemplary embodiment.

FIG. 13 illustrates a battery module 400 formed in accordance with an exemplary embodiment. The battery module 400 uses buss bars 402 having external posts 404 that connect to pins 406 on negative cell terminals 408 rather than the posts 160 (shown in FIG. 3) that extend into the bores 134 (shown in FIG. 2). A contact spring, similar to the contacts spring 136 may be loaded into the post 404 to engage the pin 406. The battery module 400 may be similar to the battery module 200 described in concurrently filed patent application titled BATTERY MODULE, having docket number AV-01439 (958-250), the disclosure of which is incorporated by reference in its entirety. Voltage signal contacts 409 are mechanically and electrically connected to a module controller 410 of the battery module 400 and to voltage signal pins 411 of the buss bars 402, which provides an electrical connection between the buss bars 402 and the module controller 410.

Figure 14:
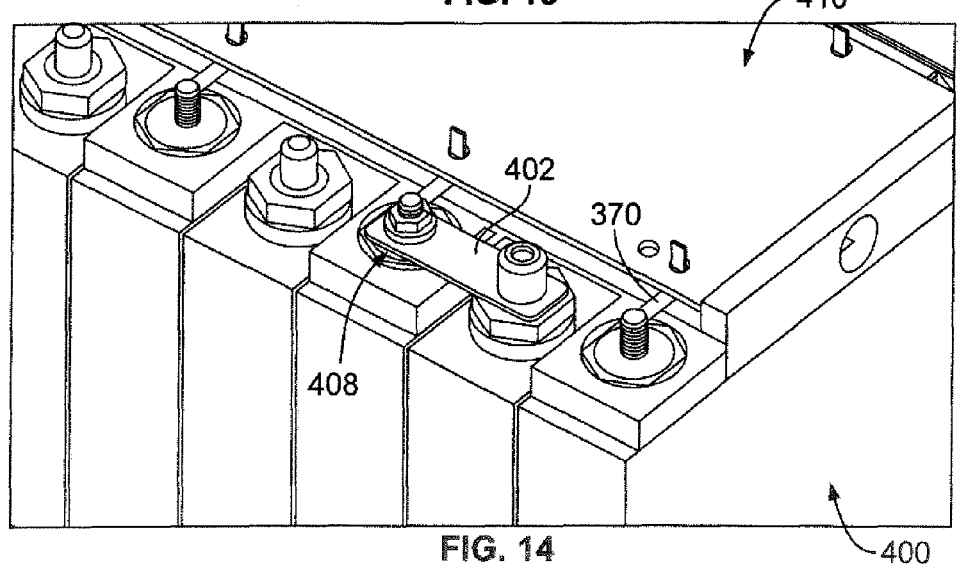
FIG. 14 illustrates a battery module formed in accordance with an exemplary embodiment.

FIG. 14 illustrates the battery module 400 using the voltage signal contacts 370 connected to a module controller 410 of the battery module 400. The signal contacts 370 are bolted between the buss bars 402 and the cell terminals 408, which provides an electrical connection between the cell terminals 408 and the module controller 410.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A battery module comprising:
    battery cells arranged side-by-side in a stacked configuration, the battery cells having positive and negative cell terminals;
    buss bars electrically connected to corresponding cell terminals to electrically connect adjacent battery cells, the bus bars including voltage signal pins extending therefrom;
    a battery cover coupled to the battery cells; and
    a module controller held by the battery cover, the module controller including a circuit board and voltage sensing contacts extending from the circuit board, the voltage sensing contacts being directly electrically connected to corresponding voltage signal pins of the buss bars to monitor a voltage of the corresponding buss bar.

2. The battery module of claim 1, wherein the module controller is electrically connected to the buss bars without wired connections therebetween.

3. The battery module of claim 1, wherein the voltage signal contacts have deflectable beams resiliently deflected by, and directly electrically connected to, the corresponding voltage signal pins to define a separable electrical interface between the voltage signal contacts and corresponding voltage signal pins.

4. The battery module of claim 1, wherein each voltage signal contact having forks with a gap therebetween, the voltage signal pins being received in corresponding gaps and engaged by corresponding forks to electrically connect the voltage signal pins and the voltage signal contacts.

5. The battery module of claim 1, wherein the battery cover includes a housing mounted directly to tops of the battery cells and a lid coupled to the housing, the housing having a slot with the module controller received in the slot, the lid covering the slot, module controller and buss bars.

6. The battery module of claim 1, wherein the battery cover includes a housing mounted directly to tops of the battery cells and a lid coupled to the housing, the housing and lid surrounding the module controller.

7. The battery module of claim 1, wherein the battery cells have gas pressure valves, the battery cover having a gas vent manifold sealed to the gas pressure valves of the battery cells, the gas vent manifold configured to vent gas exhausted through the gas pressure valves.

8. The battery module of claim 7, wherein the gas vent manifold comprises a tunnel, each of the gas pressure valves being open to the tunnel.

9. The battery module of claim 7, wherein vent seals surround the gas pressure valves to seal the battery cover to the battery cells.

10. The battery module of claim 7, wherein the battery cover includes a housing having a top and a bottom, the module controller being arranged along the top, the bottom resting on the battery cells, the housing including a tunnel routed below the module controller, the tunnel being opened to the gas pressure valves.

11. The battery module of claim 7, wherein the battery includes a tunnel defining the gas vent manifold, the tunnel being open at opposite ends of the battery cover, end caps being coupled to ends.

12. A battery module comprising:
battery cells arranged side-by-side in a stacked configuration, the battery cells having positive and negative cell terminals, the battery cells having gas pressure valves;
buss bars electrically connected to corresponding cell terminals to electrically connect adjacent battery cells; and
a battery cover coupled to the battery cells, the battery cover having a top surface and a bottom surface, the bottom surface resting on the battery cells, the top surface of the battery cover holding a module controller that is electrically connected to the buss bars to monitor a voltage of the corresponding buss bar, the battery cover having a gas vent manifold defined by a tunnel in the bottom surface being sealed to the gas pressure valves of the battery cells, the gas vent manifold configured to vent gas exhausted through the gas pressure valves wherein the buss bars include voltage signal pins extending therefrom, the module controller including a circuit board and voltage sensing contacts extending from the circuit board, the voltage sensing contacts being directly electrically connected to corresponding voltage signal pins of the buss bars to monitor a voltage of the corresponding buss bars.

13. The battery module of claim 12, wherein the module controller is electrically connected to the buss bars without wired connections therebetween.

14. The battery module of claim 12, wherein the module controller includes a circuit board and voltage signal contacts extending therefrom, the voltage signal contacts being terminated to corresponding buss bars.

15. The battery module of claim 12, wherein the battery cover includes a housing mounted directly to tops of the battery cells and a lid coupled to the housing, the housing having a slot with the module controller received in the slot, the lid covering the slot, module controller and buss bars.

16. The battery module of claim 12, wherein each of the gas pressure valves being open to the tunnel.

* * * * *